United States Patent [19]
Tomiyama et al.

[11] Patent Number: 5,127,974
[45] Date of Patent: Jul. 7, 1992

[54] METHOD OF PROTECTING COATING FILM

[75] Inventors: Takeshi Tomiyama; Takeshi Eda; Sadaaki Hashimoto; Junitiro Tomiya, all of Hiratsuka, Japan

[73] Assignee: Kansai Paint Co., Ltd., Amagasaki, Japan

[21] Appl. No.: 523,332

[22] Filed: May 14, 1990

[30] Foreign Application Priority Data

| | | |
|---|---|---|
| May 15, 1989 [JP] | Japan | 1-120942 |
| Oct. 13, 1989 [JP] | Japan | 1-266848 |
| Oct. 13, 1989 [JP] | Japan | 1-266849 |
| Mar. 2, 1990 [JP] | Japan | 2-51946 |

[51] Int. Cl.⁵ .......................... B32B 31/14
[52] U.S. Cl. ........................ 156/85; 156/87; 156/153; 156/247; 156/250; 156/252; 156/285; 156/344; 156/382; 53/441; 53/443; 53/472; 150/166; 206/335; 296/136
[58] Field of Search ............. 156/84, 85, 86, 87, 156/247, 252, 344, 285, 382, 306.3, 250, 273.1, 153; 53/441, 442, 472; 150/166, 157; 206/335, 497; 296/136; 280/847, 848, 152.3, 154, 850

[56] References Cited

U.S. PATENT DOCUMENTS

| 2,082,791 | 6/1937 | Copeman | 296/136 |
| 3,434,907 | 3/1969 | Wiggins | 156/306.3 |
| 4,261,401 | 4/1981 | Hickey | 206/335 |
| 4,763,783 | 8/1988 | Talbot | 53/442 |

FOREIGN PATENT DOCUMENTS

| 3316385 | 12/1983 | Fed. Rep. of Germany | 296/136 |
| 0007303 | 4/1979 | Japan | 206/335 |

Primary Examiner—Caleb Weston
Attorney, Agent, or Firm—Fisher, Christen & Sabol

[57] ABSTRACT

Respectively disclosed is a method of temporarily protecting a surface of a top coating of a coating finished automobile, which method comprieses (A) adhering a plastic film having a releasable pressure-sensitive adhesive layer to a body surface of the coating finished automobile and/or (B) heating a heat-shrinkable plastic film to be shrinked so as to fit to an intended shape and to cover the body surface of the coating finished automobile; which method comprises applying to the body surface of the coating finished automobile a plastic film prepared by intermittently coating a releasable pressure-sensitive adhesive layer to cover the body of the coating finished automobile; which method comprises covering the body surface of the coating finished automobile with a plastic film having a rough surface on a side contacting with a coating surface, and fixing a terminal of the film and heating, when needed, to cover in conformity with a body shape; and which method comprises subjecting a plastic film to vacuum forming to cover a body surface of the coating finished automobile in conformity with the body shape.

36 Claims, 1 Drawing Sheet

METHOD OF PROTECTING COATING FILM

BACKGROUND OF THE INVENTION (1) Field of the Invention

The present invention relates to a method of protecting a coating film, more particularly to a method of temporarily protecting a surface of a coating film of a coating finished automobile.

(2) Description of the Prior Art

Recent occurrences of damages, flashing, discoloration, etc. in a coating film due to stones, dusts, iron powder, gases, chemicals, etc. during transportation of a coating finished automobile and a resulting remarkable reduction in commercial value as a coating finished automobile often raise problems. Particularly, possibilities of occurrences of damages during transportation in a long distance, export to foreign countries, etc. are high. In order to solve the above problems, a method of coating a wax onto the coating finished automobile to a thickness of 20–40 μm has been employed. The above method has such drawbacks that uniform protection is impossible because of non-uniform thickness, that the coating is easily soiled and has low resistance to acid rain, that penetration of the wax into the coating film provides adverse effects, that a large amount of solvent is evaporated on coating the wax, that a waste water treatment for recovery of the wax is necessary, and that the above method needs many steps of processing and high cost.

SUMMARY OF THE INVENTION

It is an object of the present invention to provide a very simple and effectively improved method of temporarily protecting the body surface of the coating finished automobile, which method is free of various problems resulted from the wax coating in the prior art, for example, facilities and investments required for wax coating operations and prevention of solvent evaporation, unsatisfactory protecting ability, adverse effects due to penetration of wax into the coating film, waste water treatment due to wax washing, etc.

The present invention provides respectively a method of temporarily protecting a surface of a top coating of a coating finished automobile, which method comprises (A) adhering a plastic film having a releasable pressure-sensitive adhesive layer to a body surface of the coating finished automobile and/or (B) heating a heat-shrinkable plastic film to be shrinked so as to fit to an intended shape and to cover the body surface of the coating finished automobile (hereinafter may be referred to as a first invention); which method comprises applying to the body surface of the coating finished automobile a plastic film prepared by intermittently coating a releasable pressure-sensitive adhesive layer to cover the body of the coating finished automobile (hereinafter may be referred to as a second invention); which method comprises covering the body surface of the coating finished automobile with a plastic film having a rough surface on a side contacting with a coating surface, and fixing a terminal of the film and heating, when needed, to cover in conformity with a body shape (hereinafter may be referred to as a third invention); and which method comprises subjecting a plastic film to vacuum forming to cover a body surface of the coating finished automobile in conformity with the body shape (hereinafter may be referred to as a fourth invention).

DETAILED DESCRIPTION OF THE INVENTION

A plastic film having a releasable pressure-sensitive adhesive layer (hereinafter may be referred to as a releasable film) usually consists of a release sheet (1), a releasable pressure-sensitive adhesive layer (2) and a plastic film layer (3). The releasable film is used in such a manner that as the release sheet is peeled off the adhesive layer, the film is lapped on the body of a coating finished automobile from its terminal to be successively pressed and adhered by means of a rubber roller, squeegee, etc., resulting in being adhered all over the body of the automobile to protect the surface of the body of the automobile.

The release sheet (1) in the first invention is a sheet applied on one side of the releasable pressure-sensitive adhesive layer and has no direct relationship for protecting the body of the automobile. The release sheet may include papers, sheets, etc. coated or impregnated with a releasing agent such as silicone resin, fluorocarbon resin, wax and the like, and ones of resins, which contain no releasing agent but have releasing properties by themselves, such as polypropylene, polyethylene and the like.

The releasable pressure-sensitive adhesive layer (2) is used for the purpose of applying the plastic film layer to the surface of the object and is arranged between the release sheet layer and the plastic film layer. The pressure-sensitive adhesive suitably has a tack strength of 50–1000 g/25 mm, more preferably 200–500 g/25 mm. That is, it preferably has such a tack strength that it may easily be released at the time of releasing, but is not released in the natural state. Specific examples of the pressure-sensitive adhesive may include known resins such as natural rubber, styrene-butadiene copolymer rubber, polyisobutylene, acrylic resin, polyvinyl ether, polyvinyl isobutyl ether and the like. These resins may be used alone or as a major component. Of these resin, an acrylic resin having a glass transition temperature of $-10°$ to $-60°$ C., such as polybutyl acrylate, poly-2-ethylhexyl acrylate or the like is preferred. Further, a tackifier such as rosin, rosin ester, cumarone resin, terpene resin, hydrocarbon resin or oil-soluble phenolic resin, and a softening agent such as fatty acid ester, fats and oils of animals and plants, wax or petroleum heavy fractions may be used in combination with the above resin when needed according to compatibility with the resin. In addition thereto, fillers, pigments, aging inhibitors, stabilizers, etc. may be incorporated.

The releasable pressure-sensitive adhesive layer may have a thickness of normally 1–500 μm, particularly 20–40 μm.

The plastic film layer (3) in the first invention is applied on another side of the releasable pressure-sensitive adhesive layer and actually protect the body of the automobile from environmental influences. The plastic film layer has a thickness of preferably 1–1000 μm, particularly 30–50 μm.

The plastic film may specifically include those of polyurethane, polyimide, nylon, polyethylene, polyester, polycarbonate, plasticized polyvinyl chloride and the like.

According to another aspect of the first invention, in which a heat-shrinkable plastic film is used, the coating finished automobile is covered with the plastic film, the plastic film is partly fixed with a pressure-sensitive adhesive, fastener, etc. so that the position of the plastic film may not be largely shifted due to shrinkage, followed by heating to be shrinked and covering the body of the automobile in conformity with the shape of the body to protect the surface of the body of the automobile. The heat-shrinkable plastic film has a thickness of 5-1000 μm, particularly 10-50 μm, a degree of heat shrinkage of 10-50%, particularly 10-30%, and a film strength of 4-10 kg/25 mm. Specifically, the heat-shrinkable plastic film may include those of polyethylene, polypropylene, plasticized polyvinyl chloride, etc. The pressure-sensitive adhesive used for fixing preferably includes those showing no change in tack strength due to heating and having a tack strength of 50-1000 g/25 mm, particularly 200-500 g/25 mm, and specifically includes polyvinyl ether, polyvinyl isobutyl ether, acrylic resin, etc. The fastener may include a molded reinforced plastic, a release double-coated tape, a releasable pressure-sensitive adhesive coated magnet, etc. A heating temperature for shrinking the plastic film is preferably at such temperatures as not to lower the qualities of interior plastic parts and top coating film in the coating finished automobile, i.e. 60°-110° C., and a heating time is suitably 1-5 minutes. After the body of the automobile has been covered by shrinking the plastic film, unnecessary parts of the plastic film may be cut and removed in order to improve appearance as a commercial product.

Use of either the release film or the heat-shrinkable plastic film makes it possible to achieve the purpose of protecting the body surface of the automobile. However, the use of the release film requires times and labors more or less when released because the release film is wholly adhered On the other hand, the use of the heat-shrinkable plastic film requires times and labors more or less when the pressure-sensitive adhesive is coated. However, a particular combination in the application of the above films makes it possible to improve workability In other words, the body of the automobile is covered with the heat-shrinkable plastic film, followed by fixing a terminal of the plastic film by use of the release film so as to wrap up an edge of the body, resulting in making it possible to easily carry out adhesion and release.

The heating procedure for shrinking may be deleted in such a manner that the heat-shrinkable plastic film is molded beforehand in conformity with the body shape of the automobile to cover the coating finished automobile on use, and the film terminal may be fixed by the release film or by the fastener such as a molded reinforced plastic, a release double-coated tape, a releasable pressure-sensitive adhesive coating magnet or the like.

The plastic film prepared by intermittently coating the releasable pressure-sensitive adhesive layer in the second invention (hereinafter may be referred to as the release film) is the same as the plastic film in the first invention except that the releasable pressure-sensitive adhesive layer is intermittently coated. That is, the release film in the second invention usually consists of a release sheet (1), an intermittently coated releasable pressure-sensitive adhesive layer (2) and a plastic film layer (3), and is used in the same manner as in the first invention.

The release sheet (1) in the second invention is the same as in the first invention.

The intermittently coated releasable pressure-sensitive adhesive layer (2) used in the second invention is used in the same manner as the releasable pressure-sensitive adhesive layer (2) in the first invention except for being intermittently coated The pressure-sensitive adhesive is the same as that in the first invention and is used in the same manner as in the first invention.

The releasable pressure-sensitive adhesive layer in the second invention may have a thickness of normally 1-100 μm, particularly 15-30 μm.

The method of intermittently coating the pressure-sensitive adhesive is not specifically limited so long as it is not wholly adhered, and it may be coated in the form of point, line or net. In the case where it is coated in the form of point, smaller contacting points are preferred and too wide spaces result in lowering workability.

Specifically, a size of the point is 10-10000 μm, particularly 500-3000 μm, and a space is 10-5000 μm, particularly 250-1500 μm.

The method of intermittently coating may include a screen printing process, a process by use of an embossed roll coater, etc.

The plastic film (3) in the second invention may be the same as that in the first invention and may be used in the same manner as in the first invention.

According to the second invention, it is preferred for the plastic film to be air-permeable. Of the plastic films, the polyolefin film such as polyethylene film is preferred in that workability is improved.

It is necessary for the plastic film used in the third invention to have a rough surface on the side contacting with the coating surface of the body of the automobile, whereby non-uniform contact of the plastic film with the coating surface as in the first invention is avoided and air is uniformly contained therebetween.

The above rough surface means a film surface in a uniformly nervy state Practically, it is desirable for a size of contacting points between the plastic film and the coating surface to be small, and it is desirable for crest portions contacting with the coating surface to be sharp like a tooth form of a saw. Specifically, a degree of roughness of the rough surface is such that an average roughness (Ra) on the central line is preferably 1-5000 μm, more preferably 20-500 μm, and a maximum roughness in height (Rmax) is preferably 1-10000 μm, more preferably 20-1000 μm. The above rough surface may be formed by use of an embossed roll coater, a sand paper, etc.

The plastic film used in the third invention may include any general-purpose ones, preferably a heat-shrinkable plastic film. The heat-shrinkable plastic film used in the third invention is the same as that used in the first invention except that the film thickness is preferably 10-2000 μm, more preferably 50-80 μm.

According to the third invention, the plastic film may be made air-permeable. Specifically, the plastic film may be uniformly perforated by use of an embossed roll, etc. to make physically air-permeable, or as the plastic film, a polyolefin film such as polyethylene film, etc , which have air-permeability themselves, may be used, whereby workability is improved.

According to the third invention, a terminal of the plastic film covering the coating finished automobile is fixed with a pressure-sensitive adhesive, fastener, etc. so that its position may not be shifted The plastic film may be divided into fractions in conformity with the shape of the body of the automobile to cover it, but preferably the body may be wholly covered with the plastic film, followed by heating to be shrinked and covering the body of the automobile in conformity with the shape of the body. Otherwise, the body of the automobile may be covered with a plastic film, which has been molded beforehand in conformity with the body shape, unnecessary air may be expelled from above by use of a sponge, etc., and the terminal of the plastic film may be fixed.

The pressure-sensitive adhesive used for fixing in the third invention may be the same as that in the first invention.

The fastener used for fixing in the third invention may include a releasable pressure-sensitive plastic film, a molded reinforced plastic, a releasable double-coated tape, a releasable pressure-sensitive adhesive coating magnet, etc. Of these, the releasable pressure-sensitive plastic film is particularly preferred, whereby the above fixing may be carried out so that the edge portion of the body covered with the plastic film may be wrapped up, resulting in making adhesion and release procedures easy.

The vacuum forming in the fourth invention is such that a coating object and a plastic film are arranged so as to form a closed space therebetween, and the air within the space is sucked and removed so that the plastic film may be pressed and adhered onto the surface of the coating object.

BRIEF DESCRIPTION OF THE DRAWINGS

In FIGS. 1-3, 1 is a vacuum forming machine, 2 is a pressurized air inlet, 3 is an air outlet, 4 is a heater, 5 is a plastic film, 6 is a coating finished automobile and 7 is a fixing part.

One embodiment of the vacuum forming in the fourth invention will be explained in detail with reference to the accompanying drawings.

Figure 1:
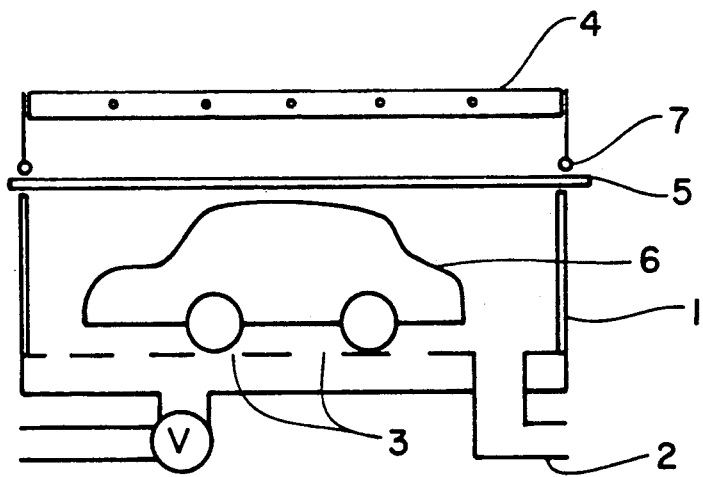
FIGS. 1-3 are explanatory cross sectional views showing successive steps of one embodiment of the present invention.
Figure 2:
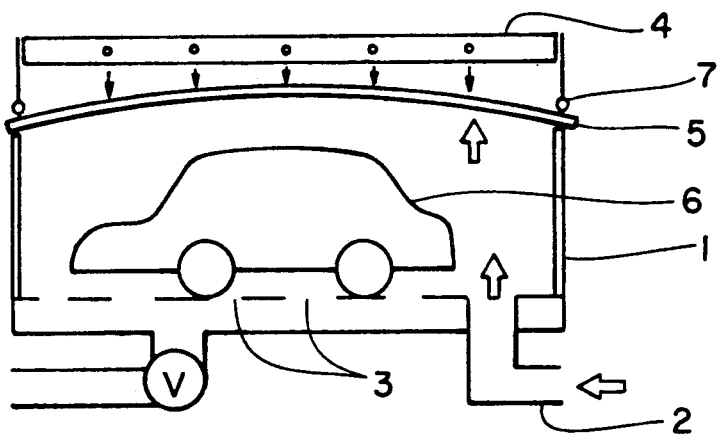

As shown in FIG. 1, a coating finished automobile 6 is placed in a vacuum forming machine 1 having an air outlet 3 leading to a suction apparatus, a pressurized air inlet 2 leading to a blower, a fixing part 7 for holding a plastic film 5 in position and a heater 4 for heating the plastic film 5, and the plastic film 5 having a sufficient size to cover the body of the automobile is held in position over the body of the automobile by fixing its terminals. Next, as shown in FIG. 2, the plastic film 5 is softened by the heater 4 feeding a warm air from the pressurized air inlet, when needed, to such an extent that the plastic film floats up. Heating is carried out normally at 50°-110° C. for 1-5 minutes depending on the softening temperature, etc. of the plastic film used. After the plastic film 5 has sufficiently been softened, heating is stopped and the pressurized air inlet is closed. Immediately thereafter, the air contained in the vacuum forming machine is expelled through the air outlet 3, resulting in that the softened plastic film 5 is pressed and adhered onto the body surface to cover the body of the automobile. A degree of vacuum on expelling the air is preferably in the range of 700-750 mmHg.vac. Finally, unnecessary parts of the plastic film are cut and removed to complete the procedures of covering and protecting the body of the automobile.

In the case where the plastic film is pressed and adhered onto respective sections of the body, the plastic film may be held in position depending on respective sections, followed by repeating the above vacuum forming procedures.

When the plastic film is pressed and adhered onto the body surface according to the vacuum forming, it is desirable that the plastic film is uniformly pressed and adhered onto the coating surface of the body, in other words, that non-uniform presence of parts which have been pressed and adhered and parts which have not been pressed and adhered, i.e. parts which have slightly enfolded air is avoided. If non-uniformness of the pressed and adhered state is left to stand for a long period of time, conditions of the coating surface in the pressed and adhered parts differ from those in the parts which have not been pressed and adhered.

In order to obtain the uniformly pressed and adhered state, it is preferred that the plastic film used in the fourth invention has a rough surface on a side contacting with the coating surface of the body, or that the plastic film is sprayed with fine powder on the side contacting with the coating surface of the body.

The rough surface in the fourth invention is the same as that in the plastic film of the third invention.

The plastic film in the fourth invention may be uniformly sprayed with fine powder generally by a process such as an electrostatic spraying process.

The above fine powder may include preferably a natural talc, which does not damage the coating surface, and may also include powder of synthetic resins such as nylon, polyethylene and the like. The particle size of the above powder is 1-100 $\mu$m, preferably 1-10 $\mu$m.

The plastic film in the fourth invention may be prepared by intermittently coating the releasable pressure-sensitive adhesive layer in the same manner as in the second invention.

The plastic film used in the fourth invention may include any general-purpose ones, preferably thermoplastic ones. The plastic film has a thickness of 10-2000 $\mu$m, preferably 50-200 $\mu$m, and a film strength of preferably 0.5-3 kg/25 mmHg. Specifically, the plastic film may include ones of polyethylene, polypropylene, plasticized polyvinyl chloride, etc.

According to the fourth invention, the plastic film may be made air-permeable in the same manner as that in the third invention, except that it is necessary for air-permeability to be such an extent as not to produce troubles in the suction procedures of the vacuum forming.

According to the first invention, there is provided a very simple and effectively improved method of temporarily protecting the body surface of the coating finished automobile, which method is free of various problems resulted from the wax coating in the prior art, for example, facilities and investments required for wax coating operations and prevention of solvent evaporation, unsatisfactory protecting ability, adverse effects due to penetration of wax into the coating film, waste water treatment due to wax washing, etc.

According to the second invention and the third invention, there is provided an improved method of temporarily protecting the body surface of the coating finished automobile, which method is capable of solving such problems in the first invention that if non-uniformness of the pressed and adhered state, that is, non-uniform presence of parts which have been pressed and adhered and parts which have not been pressed and adhered, i.e., parts which have slightly enfolded air, is left to stand for a long period of time, the traces of the parts which have been pressed and adhered show a pattern different in gloss from the parts which have not been pressed and adhered, and that an additional step is needed in order to completely remove the traces by applying an ultrafine compound wax.

According to the fourth invention, there is provided a very simple and effectively improved method of temporarily protecting the body surface of the coating finished automobile, which method is free of such drawbacks in the first, the second and the third inventions that a film cut in conformity with the shape of the body of the automobile is pressed and adhered onto the body of the automobile successively from the terminal of the body by manual operations, resulting in taking a fairly long period of time, and which method is capable of very simply and quickly covering the body of the automobile as the shape is, even if the shape is complicated.

The present invention will be explained more in detail by the following Examples.

EXAMPLE 1

A releasable plasticized polyvinyl chloride film (marketed by San-Ei Chemical Industries Ltd.) is cut in conformity with a body shape of an automobile, a terminal of the releasable sheet is removed according to the usual application process of the releasable film, an exposed adhesive surface is pressed and adhered on a terminal of the body of the automobile to be fixed, and as the releasable sheet is successively released, the film is pressed and adhered onto the body to the other terminal of the body by a squeegee so that air bubble may not be enfolded to complete the film adhesion procedure, followed by being naturally left to stand at room temperature for 3 months, and by peeling the film applied to the body from the terminal with the result that the film is easily released and that nothing abnormal is observed regarding to the coating film conditions on the body surface.

EXAMPLE 2

A heat-shrinkable polyethylene film (marketed by Okura Industrial Co., Ltd.) is cut in conformity with the shape of the body of an automobile to cover the body, followed by fixing a terminal of the heat-shrinkable film with a releasable plasticized polyvinyl chloride film so as to wrap up an edge of the body, pressing and adhering the terminal by use of a squeegee, heating the body at 80° C. for 5 minutes so as to tightly fit the heat-shrinkable film to the body, being naturally left to stand at room temperature for 3 months, and peeling a film applied to the body from the terminal with the result that the film is easily released and that nothing abnormal is observed on the coating surface.

EXAMPLE 3

A releasable pressure-sensitive adhesive layer (marketed by Nippon Carbide Industries Co., Ltd.) is printed on one side of a plasticized polyvinyl chloride film (marketed by San-Ei Chemical Industries Ltd.) in the form of a point having a size of 1000 $\mu$m, a space of 1000 $\mu$m and a thickness of 15 $\mu$m according to the screen printing, and a silicon release paper (marketed by Saneh Chemical Industries Co., Ltd.) is applied to prepare a pressure-sensitive adhesive-applied plastic film. The resulting film is cut in conformity with a body shape of an automobile, a terminal of the releasable sheet is removed according to the usual application process of the releasable sheet, an exposed adhesive surface is pressed and adhered on a terminal of the body of the automobile to be fixed, and as the releasable sheet is successively released, the film is pressed and adhered onto the body to the other terminal of the body by a squeegee so that air bubble may not be enfolded to complete the film adhesion procedure, followed by being left to stand at room temperature for 3 months, and by peeling the film applied to the body from the terminal with the result that the film is easily released and that nothing abnormal due to changes in gloss, etc. is observed regarding to the coating film conditions on the body surface.

EXAMPLE 4

A releasable pressure-sensitive adhesive layer (marketed by Nippon Carbide Industries Co., Ltd.) is printed on one side of a polyethylene film (marketed by Nippon Carbide Industries Co., Ltd.) in the form of a point having a size of 500 $\mu$m, a space of 1000 $\mu$m and a thickness of 15 $\mu$m according to the screen printing, and a silicon release paper (marketed by San-Ei Chemical Industries Ltd.) is applied to prepare a pressure-sensitive adhesive-applied plastic film. The resulting film is cut in conformity with a body shape of an automobile to carry out the same film adhesion procedure as in Example 1, followed by being naturally left to stand at room temperature for 3 months, and by peeling the film applied to the body from the terminal with the result that the film is easily released and that nothing abnormal due to changes in gloss, etc. is observed regarding to the coating film conditions on the body surface.

EXAMPLE 5

A back side of a heat-shrinkable polyethylene film (marketed by Okura Industrial Co., Ltd.) is uniformly ground by a No. 400 sandpaper, the film is then cut in conformity with the shape of the body of an automobile to cover the body so that the ground surface may contact with the coating surface of the automobile, followed by fixing a terminal of the heat-shrinkable film with a releasable plasticized polyvinyl chloride film so as to wrap up an edge of the body, pressing and adhering the terminal by use of a squeegee, heating the body at 80° C. for 5 minutes so that the heat-shrinkable film may be shrinked as the body shape is, being left to stand at room temperature for 3 months, and peeling the film covering the body from the terminal with the result that the film is easily released and that nothing abnormal due to changes in gloss, etc. is observed regarding to the coating film conditions.

EXAMPLE 6

A heat-shrinkable polyethylene film (marketed by Okura Industrial Co., Ltd.) is uniformly perforated by use of an embossed roller at a rate of 6 holes having a diameter of about 0.5 mm/cm$^2$, the resulting film is then divided and cut in conformity with the body shape of an automobile to cover the body, followed by softly pressing and adhering with a sponge so that non-uniform air layer may disappear, fixing a terminal of the heat-shrinkable film with a releasable plasticized polyvinyl chloride film so as to wrap up an edge of the body, pressing and adhering by use of a squeegee, being left to stand at room temperature for 3 months, and peeling the film applied to the body from the terminal with the result that the film is easily released and that nothing abnormal due to changes in gloss, etc. is observed regarding to the coating film conditions.

EXAMPLE 7

Figure 3:
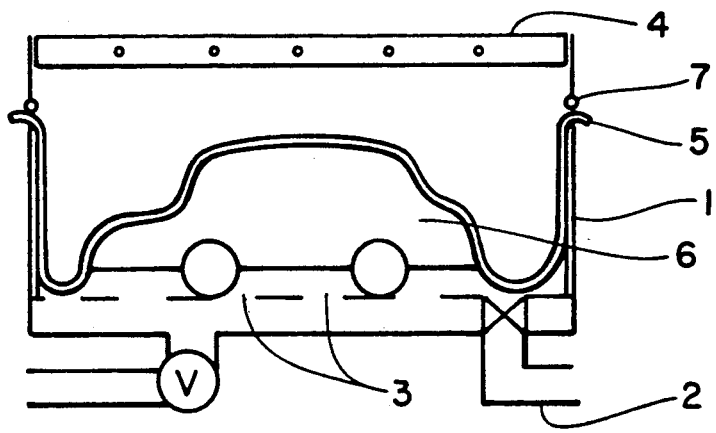

A polyethylene film (marketed by San-Ei Chemical Industries Ltd.) having a thickness of 80 $\mu$m is placed in a vacuum forming machine 1 as shown in FIG. 1, the film is heated and softened as shown in FIG. 2, and the air contained therein is then expelled so that the film may be pressed and adhered onto the body of a coating finished automobile 6 as shown in FIG. 3. The vacuum forming machine used is one marketed by Fuse Vacuum Forming Co., Ltd., heating of the film is carried out by use of a far infrared rays heater under such conditions that a film surface temperature is 100° C. and a degree of vacuum is 720 mmHg.vac. Thereafter, unnecessary parts of the film is removed to complete the covering and protecting procedures. The above procedures take only about 8 minutes, resulting in making it possible to very simply cover as the body shape is. The automobile covered as above is left to stand outdoors for two months, followed by removing the film applied to the body with the result that nothing abnormal is observed on the coating film conditions.

EXAMPLE 8

A polyvinyl chloride film (marketed by Dainippon Ink and Chemicals, Incorporated), a back surface of which is uniformly sprayed with talc (marketed by Nippon Talc Co., Ltd.) and which has a thickness of 80 μm, is pressed and adhered onto the coating finished automobile in the same manner as in Example 1, followed by removing unnecessary parts of the film to complete the covering and protecting procedures. The above procedures take about 10 minutes, resulting in making it possible to very easily cover as the body shape is. The automobile covered as above is left to stand outdoors for two months, followed by removing the film applied to the body with the result that nothing abnormal is observed on the coating film conditions.

EXAMPLE 9

A polyvinyl chloride film (marketed by Dainippon Ink and Chemicals, Incorporated), a back surface of which is uniformly ground with a No. 400 sandpaper and which has a thickness of 80 μm, is pressed and adhered onto the coating finished automobile in the same manner as in Example 1, followed by removing unnecessary parts of the film to complete the covering and protecting procedures. The above procedures take about 10 minutes, resulting in making it possible to very easily cover as the body shape is. The automobile covered as above is left to stand outdoors for two months, followed by removing the film applied to the body with the result that nothing abnormal is observed on the coating film conditions.

What is claimed is:

1. A method of temporarily protecting a surface of a top coating of a coating finished automobile, which method comprises cutting a releasable film formed by successively laminating a release sheet, a releasable pressure-sensitive adhesive layer having a tack strength of 200 to 500 g/25 mm and having a thickness of 20 to 40 μm and a plastic film layer having a thickness of 30 to 50 μm in conformity with a body shape of the automobile, releasing one end portion of the releasable sheet, pressing and adhering a resulting exposed adhesive layer onto a corresponding one end portion of the body surface of the automobile to be fixed, and successively releasing a remaining releasable sheet to the other end portion thereof to successively press and adhere a successively exposed adhesive layer onto a remaining body surface of the automobile so as to adhere the exposed adhesive layer onto the whole surface of the body of the automobile.

2. A method as claimed in claim 1 wherein the exposed adhesive layer is pressed and adhered onto the body surface of the automobile by means of a rubber roller or a squeegee.

3. A method as claimed in claim 1 wherein the adhesive layer comprises an acrylic resin having a glass transition temperature of −10° to −60° C.

4. A method as claimed in claim 1 wherein the plastic film is selected from the group consisting of polyurethane, polyimide, nylon, polyethylene, polyester, polycarbonate and plasticized polyvinyl chloride.

5. A method of temporarily protecting a surface of a top coating of a coating finished automobile, which method comprises covering a whole surface of the body of the automobile with a heat-shrinkable plastic film having a thickness of 10 to 50 μm, a degree of heat shrinkage of 10 to 30 percent and a film strength of 4 to 10 kg/25 mm, partly fixing the plastic film onto the body surface of the automobile with a fixing device selected from a group consisting of a pressure-sensitive adhesive and a fastener, and heating the plastic film at 60° C. to 110° C. for 1 to 5 minutes to be shrunk and tightly fit onto the whole surface of the body of the automobile.

6. A method as claimed in claim 5 wherein the pressure-sensitive adhesive has a tack strength of 200 to 500 g/25 mm.

7. A method as claimed in claim 5 wherein the fastener is selected from the group consisting of a releasable pressure-sensitive plastic film, a molded reinforced plastic, a release double-coated tape and a releasable pressure-sensitive adhesive control magnet.

8. A method as claimed in claim 5 wherein the plastic film is selected from the group consisting of polyethylene, polypropylene and plasticized polyvinyl chloride.

9. A method of temporarily protecting a surface of a top coating of a coating finished automobile, which method comprises covering a whole surface of the body of the automobile with a heat-shrinkable plastic film having a thickness of 10 to 50 μm, a degree of heat shrinkage of 10 to 30 percent and a film strength of 4 to 20 kg/25 mm, fixing an edge portion of the plastic film onto a corresponding edge portion of the body of the automobile by releasing a release sheet of a releasable film formed by successively laminating the release sheet, a releasable pressure-sensitive adhesive layer having a tack strength of 200 to 500 g/25 mm and having a thickness of 20 to 40 μm and a plastic layer having a thickness of 30 to 50 μm and by applying a resulting laminate composed of the releasable pressure-sensitive adhesive layer and the plastic layer onto the corresponding edge portion of the plastic film and of the body of the automobile in such a manner than an exposed surface of the releasable pressure-sensitive adhesive layer can be faced to the corresponding edge portion of the plastic film and of the body of the automobile so as to wrap up the edge portion of the plastic film and of the body of the automobile, pressing and adhering the exposed adhesive layer onto the corresponding edge portion of the plastic film and of the body surface of the automobile, and heating the plastic film at 60° to 110° C. for 1 to 5 minute to be shrunk and tightly fit onto the whole surface of the body of the automobile.

10. A method of temporarily protecting a surface of a top coating of a coating finished automobile, which method comprises intermittently coating a releasable pressure-sensitive adhesive having a tack strength of 200 to 500 g/25 mm onto one side of a plastic film having a thickness of 30 to 50 μm to form an intermittent releasable pressure-sensitive adhesive layer of 15 to 30 μm, laminating a releasable sheet onto the intermittent releasable pressure-sensitive adhesive layer to form a release film, cutting the release film in conformity with a body shape of the automobile, releasing one end portion of the releasable sheet, pressing and adhering a resulting exposed intermittent adhesive layer onto a corresponding one end portion of the body surface of the automobile to be fixed, and successively releasing a remaining intermittent releasable sheet to the other end portion thereof to successively press and adhere a successively exposed intermittent adhesive layer onto a remaining body surface of the automobile so as to adhere the exposed intermittent adhesive layer onto the whole surface of the body of the automobile.

11. A method as claimed in claim 10 wherein the plastic film is air-permeable.

12. A method as claimed in claim 10 wherein the plastic film is uniformly perforated by use of an embossed roll to be air-permeable.

13. A method as claimed in claim 10 wherein the adhesive layer comprises an acrylic resin having a glass transition temperature of − ° to −60° C.

14. A method as claimed in claim 10 wherein the plastic film is selected from the group consisting of polyurethane, polyimide, nylon, polyethylene, polyester, polycarbonate and plasticized polyvinyl chloride.

15. A method as claimed in claim 10 wherein the pressure-sensitive adhesive is intermittently coated according to a screen printing process or a process by use of an embossed roll coater.

16. A method as claimed in claim 10 wherein the pressure-sensitive adhesive is intermittently coated in the form of dot, line or net.

17. A method as claimed in claim 16 wherein a size of the dot is 500 to 3000 μm and a space between dots is 250 to 1500 μm.

18. A method of temporarily protecting a surface of a top coating of a coating finished automobile, which method comprises forming a rough surface having a degree of roughness such that an average roughness (Ra) on a central line is 20 to 500 μm and a maximum roughness in height (Rmax) is 20 to 1000 μm on one side of a plastic film, cutting the plastic film in conformity with a body surface of the automobile, uniformly covering the whole surface of the body of the automobile with the plastic film, and fixing an edge portion of the plastic film onto a corresponding edge portion of the body of the automobile with a fixing device selected from a group consisting of a pressure-sensitive adhesive and a fastener.

19. A method as claimed in claim 18 wherein the pressure-sensitive adhesive has a tack strength of 200 to 500 g/25 mm.

20. A method as claimed in claim 18 wherein the fastener is selected from the group consisting of a releasable pressure-sensitive plastic film, a molded reinforced plastic, a release double-coated tape and a releasable pressure-sensitive adhesive coated magnet.

21. A method as claimed in claim 18 wherein the plastic film is a heatshrinkable plastic film having a thickness of 50 to 80 μm, a degree of heat shrinkage of 10 to 30 percent and a film strength of 4 to 10 kg/25 mm, and the heat-shrinkage plastic film is heated at 60° to 110° C. for 1 to 5 minutes after the step of fixing the edge portion of the plastic film onto the corresponding edge portion of the body of the automobile.

22. A method as claimed in claim 18 wherein the rough surface is formed by use of a device selected from a group consisting of an embossed roll coater and a sand paper.

23. A method as claimed in claim 18 wherein the plastic film is air-permeable.

24. A method as claimed in claim 18 wherein the plastic film is uniformly perforated by use of an embossed roll to be air-permeable.

25. A method of temporarily protecting a surface of a top coating of a coating finished automobile, which method comprises forming a rough surface having a degree of roughness such that an average roughness (Ra) on a central line is 20 to 500 μm and a maximum roughness in height (Rmax) is 20 to 1000 μm on one side of a plastic film, cutting the plastic film in conformity with a body surface of the automobile, uniformly covering the whole surface of the body of the automobile with the plastic film, and fixing an edge portion of the plastic film onto a corresponding edge portion of the body of the automobile with a pressure-sensitive adhesive or a fastener by releasing a release sheet of a releasable film formed by successively laminating the release sheet, a releasable pressure-sensitive adhesive layer having a tack strength of 200 to 500 g/25 mm and a plastic layer having a thickness of 30 to 50 μm and by applying a resulting laminate composed of the releasable pressure-sensitive adhesive layer of the releasable pressure-sensitive adhesive layer and the plastic layer onto the corresponding edge portion of the plastic film and of the body of the automobile in such a manner than an exposed surface of the releasable pressure-sensitive adhesive layer can be faced to the corresponding edge portion of the plastic film and of the body of the automobile so as to wrap up the edge portion of the plastic film and of the body of the automobile, and pressing and adhering the exposed adhesive layer onto the corresponding edge portion of the plastic film and of the body surface of the automobile.

26. A method as claimed in claim 25 wherein the plastic film is a heat-shrinkable plastic film having a thickness of 50 to 80 μm, a degree of heat shrinkage of 10 to 30 percent and a film strength of 4 to 10 kg/25 mm, and the heat-shrinkable plastic film is heated at 60° to 110° C. for 1 to 5 minutes after the step of fixing the edge portion of the plastic film onto the corresponding edge portion of the body of the automobile.

27. A method as claimed in claim 25 wherein the rough surface is formed by use of a device selected from a group consisting of an embossed roll coater and a sand paper.

28. A method as claimed in claim 25 wherein the plastic film is air-permeable.

29. A method as claimed in claim 25 wherein the plastic film is uniformly perforated by use of an embossed roll to be air-permeable.

30. A method of temporarily protecting a surface of a top coating of a coating finished automobile, which method comprises subjecting a plastic film having a thickness of 50 to 200 μand a film strength of 0.5 to 3 kg/25 mm to vacuum forming to cover the whole surface of the body of the automobile with the plastic film, said vacuum forming being carried out according to a process which comprises placing the coating finished automobile in a vacuum forming machine having an air outlet leading to a suction apparatus, a pressurized air inlet leading to a blower, a fixing part for holding a plastic film in position and a heater for heating the plastic film, holding in position the plastic film having a sufficient size to cover the body surface of the automobile by fixing its edge portion, heating the plastic film by the heater feeding a warm air from the pressurized air inlet at 50° to 110° C. for 1 to 5 minutes to such an extent that the plastic film is softened and floats up, followed by stopping heating and closing the pressurized air inlet, immediately thereafter expelling the air contained therein under a degree of vacuum of 700 to 750 mm Hg.vac. so that the softened plastic film may be pressed and adhered onto the body surface to cover the whole surface of the body of the automobile.

31. A method as claimed in claim 30 wherein one side of the plastic film is sprayed with fine powder having a particle size of 1 to 10 μm according to an electrostatic spraying process.

32. A method as claimed in claim 30 wherein the plastic film is selected from the group consisting of polyethylene, polypropylene and plasticized polyvinyl chloride.

33. A method as claimed in claim 30 wherein one side of the plastic film has a rough surface such that an average roughness (Ra) on a central line is 20 to 500 μm and a maximum roughness in height is 20 to 1000 μm.

34. A method as claimed in claim 33 wherein the rough surface is formed by use of an embossed roll coater and a sand paper.

35. A method as claimed in claim 30 wherein the plastic film is air-permeable.

36. A method as claimed in claim 35 wherein the plastic film is uniformly perforated by use of an embossed roll to be air-permeable.

* * * * *